(12) United States Patent
Asai et al.

(10) Patent No.: US 11,370,085 B2
(45) Date of Patent: Jun. 28, 2022

(54) SHOT TREATMENT APPARATUS AND SHOT TREATMENT METHOD

(71) Applicant: SINTOKOGIO, LTD., Nagoya (JP)

(72) Inventors: Akihiro Asai, Nagoya (JP); Motoaki Ishiguro, Nagoya (JP); Shuichi Kamori, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 0 days.

(21) Appl. No.: 17/080,462

(22) Filed: Oct. 26, 2020

(65) Prior Publication Data
US 2021/0197338 A1 Jul. 1, 2021

(30) Foreign Application Priority Data
Dec. 26, 2019 (JP) .............................. JP2019-235345

(51) Int. Cl.
| | | |
|---|---|---|
| *B24C 1/10* | (2006.01) | |
| *B24C 9/00* | (2006.01) | |
| *B24C 3/22* | (2006.01) | |
| *B24C 7/00* | (2006.01) | |
| *B24C 3/06* | (2006.01) | |
| *B24C 3/32* | (2006.01) | |

(52) U.S. Cl.
CPC .................. *B24C 1/10* (2013.01); *B24C 3/22* (2013.01); *B24C 9/00* (2013.01); *B24C 3/06* (2013.01); *B24C 3/32* (2013.01); *B24C 7/00* (2013.01)

(58) Field of Classification Search
CPC .... B24C 1/10; B24C 9/00; B24C 3/22; B24C 9/003; B24C 3/20; G01N 27/72
See application file for complete search history.

(56) References Cited

U.S. PATENT DOCUMENTS

| | | | | |
|---|---|---|---|---|
| 1,713,965 A | * | 5/1929 | Hull ......................... | B24C 3/22 451/84 |
| 6,694,789 B2 | * | 2/2004 | Yamamoto ................ | B24C 1/10 72/53 |
| 2011/0097972 A1 | * | 4/2011 | Suzuki ...................... | B24C 1/10 451/8 |
| 2013/0213104 A1 | | 8/2013 | Yamamoto | |
| 2018/0275681 A1 | * | 9/2018 | Gariepy ............... | G05D 1/0297 |
| 2021/0286348 A1 | * | 9/2021 | Jalluri .............. | G05B 19/41875 |

FOREIGN PATENT DOCUMENTS

JP 2012-101304 A 5/2012

\* cited by examiner

*Primary Examiner* — Ryan J. Walters
(74) *Attorney, Agent, or Firm* — Oliff PLC

(57) ABSTRACT

A shot treatment apparatus and a shot treatment method applicable to the mass production of a wide range of products. A shot treatment apparatus, comprising: a spinning table which has a first rotary shaft and which holds and rotates a workpiece; an ejection apparatus that ejects a shot media from a nozzle to the workpiece; a cabinet having a treatment chamber formed therein; and a control apparatus comprising a first control unit that controls the ejection apparatus, the nozzle being held so as to be positionable and three-dimensionally swingable with respect to the workpiece.

5 Claims, 6 Drawing Sheets

SHOT TREATMENT APPARATUS AND SHOT TREATMENT METHOD

TECHNICAL FIELD

The present invention relates to a shot treatment apparatus and a shot treatment method.

BACKGROUND

Shot treatment apparatuses are widely known as apparatuses that perform surface treatments, such as blast-processing and shot-peening, by ejecting a solid-gas two-phase flow in which a shot media is mixed with a high-pressure gas flow towards the processed object by means of an ejection nozzle. In recent years, many mechanisms have been devised to make improvements therefor, including the operation of ejection nozzles and movement of workpieces in shot treatments, in order to increase productivity.

Patent Document 1 discloses a shot treatment apparatus in which multiple spinning tables are provided on a revolving table and workpieces are held and rotated by means of a holding mechanism on the spinning tables in order to efficiently produce (process) products with the least possible idle time. The held workpieces are sequentially conveyed to a treatment chamber by means of rotation of the revolving table and are processed by a shot media being ejected from a fixed nozzle within the treatment chamber.

CITATION LIST

Patent Literature

Patent Document 1: JP 2012-101304 A

SUMMARY OF INVENTION

Technical Problem

In the shot treatment apparatus disclosed in Patent Document 1, because the nozzle is fixed, there is a need to modify settings, such as nozzle position and rotation speed, each time the processed product is changed, and in order to accommodate mass production of a wide range of products, there is a need to consider configurations therefor.

The present invention was made in view of the circumstances mentioned above, and a problem to be solved by the present invention is to provide a shot treatment apparatus and a shot treatment method applicable to the mass production of a wide range of products.

Solution to Problem

The present invention employs the means below in order to solve the above-mentioned problem.

Specifically, the shot treatment apparatus of the present invention comprises:
a cabinet having a treatment chamber formed therein;
a spinning table which is disposed within the treatment chamber and which holds and rotates a workpiece;
an ejection apparatus which comprises a nozzle that ejects a shot media to the workpiece and which ejects the shot media from the nozzle to the workpiece to process the workpiece; and
a control apparatus that controls the ejection apparatus, the nozzle being held so as to be positionable and three-dimensionally swingable with respect to the workpiece.

According to such a configuration, because the nozzle is held so as to be positionable and three-dimensionally swingable with respect to the workpiece, it is possible to efficiently perform processing corresponding to the type of the workpiece.

In one aspect of the present invention, the shot treatment apparatus comprises:
a revolving table on which spinning tables are disposed on the same circumference at predetermined intervals,
wherein the control apparatus controls rotation of the revolving table such that the spinning tables sequentially move to a position of the nozzle.

According to such a configuration, because the shot treatment apparatus can simultaneously perform pretreatment, cleaning, workpiece installation/removal, and the like for other workpieces while subjecting a workpiece to a shot treatment, it is possible to improve the efficiency of workpiece processing.

In one aspect of the present invention, the control apparatus comprises work procedure information set so as to be selectable for each type of the workpiece, wherein the ejection and processing is performed on the basis of the selected work procedure information. According to such a configuration, because settings corresponding to the type of the workpiece can be prepared beforehand as work procedure information, it is possible to easily change the settings of the ejection apparatus.

In one aspect of the present invention, the shot treatment apparatus comprises a measuring apparatus that measures at least either a pressure or a flow rate of a fluid that circulates the shot media of the ejection apparatus and a pressure at which the shot media is ejected from the nozzle, wherein the control apparatus controls the ejection apparatus on the basis of the measurement results of the measuring apparatus. According to such a configuration, because it is possible to monitor the ejection state of the shot media by means of the measuring apparatus, it is possible to reliably control the workpiece processing.

In one aspect of the present invention, the shot treatment apparatus comprises a recognition apparatus that recognizes a type of the workpiece, wherein selection of work procedure information is performed on the basis of the type of the workpiece recognized by the recognition apparatus. According to such a configuration, because it is possible to recognize the type of the workpiece to be subjected to a shot treatment ahead of time and select work procedure information, it is possible to efficiently perform the setting of the workpiece processing.

The shot treatment method of the present invention is performed by means of a shot treatment apparatus comprising a spinning table that holds and rotates a workpiece and an ejection apparatus that ejects a shot media from a nozzle to the workpiece. The shot treatment method comprises:
changing the position of the nozzle and three-dimensionally swinging the nozzle with respect to the workpiece to perform a shot treatment.

According to such a method, because the nozzle is held so as to be positionable and three-dimensionally swingable with respect to the workpiece, it is possible to efficiently perform the processing corresponding to the type of the workpiece.

In one aspect of the present invention, the shot treatment apparatus further comprises a revolving table on which multiple spinning tables are annularly disposed at equal intervals, wherein the revolving table intermittently circumferentially moves multiple workpieces to a shot treatment position.

According to such a method, because multiple workpieces are held on the revolving table and it is possible to simultaneously perform pretreatment, cleaning, and workpiece installation/removal for other workpieces while subjecting a workpiece to a shot treatment, it is possible to improve the efficiency of workpiece processing.

The shot treatment method of the present invention comprises work procedure information set for each type of the workpiece and comprises being performed on the basis of the selected work procedure information.

According to such a method, because settings corresponding to the type of the workpiece can be prepared beforehand as work procedure information, it is possible to easily change the settings of the ejection apparatus.

The shot treatment method of the present invention comprises measuring at least either a pressure or a flow rate of a fluid that circulates the shot media and a pressure at which the shot media is ejected from the nozzle, and controlling an action of the shot treatment apparatus on the basis of the measurement results.

According to such a method, because it is possible to monitor the ejection state of the shot media by means of the measuring apparatus, it is possible to reliably control the workpiece processing.

The shot treatment method of the present invention comprises recognizing a type of the workpiece, wherein selection of work procedure information comprises being performed on the basis of the recognized type of the workpiece.

According to such a method, because it is possible to recognize the type of the workpiece to be subjected to a shot treatment ahead of time and select work procedure information, it is possible to efficiently set the workpiece processing.

Effects of Invention

According to the present invention, it is possible to provide a shot treatment apparatus and a shot treatment method applicable to the mass production of a wide range of products.

DESCRIPTION OF EMBODIMENTS

Embodiment

Figure 1:
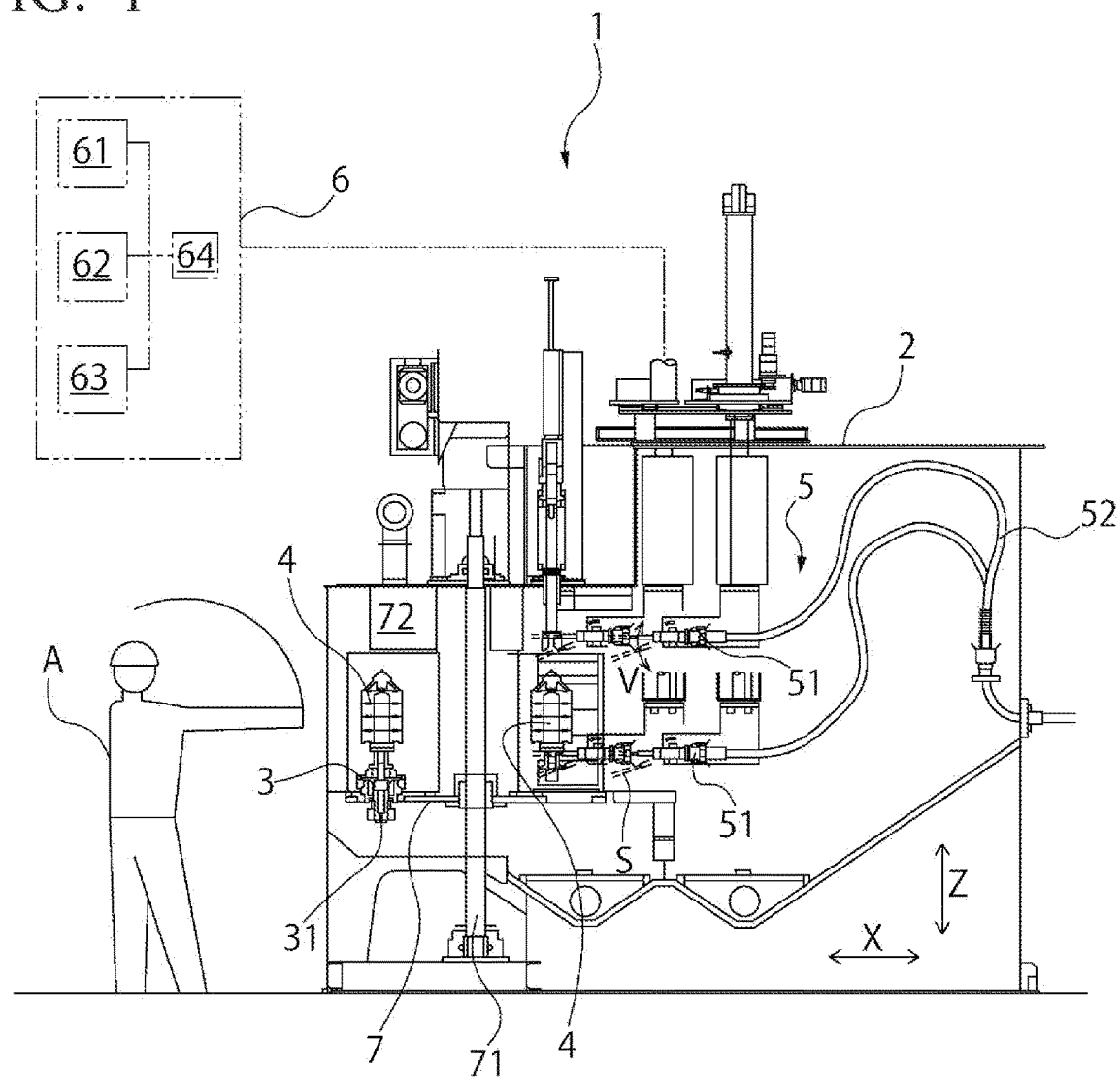
FIG. 1 is an explanatory side view of a shot treatment apparatus according to an embodiment of the present invention.

An embodiment of the present invention is described below with reference to the drawings. FIG. 1 is an explanatory side view of a shot treatment apparatus according to the embodiment of the present invention and FIG. 2 is an explanatory plan view thereof.

Figure 2:
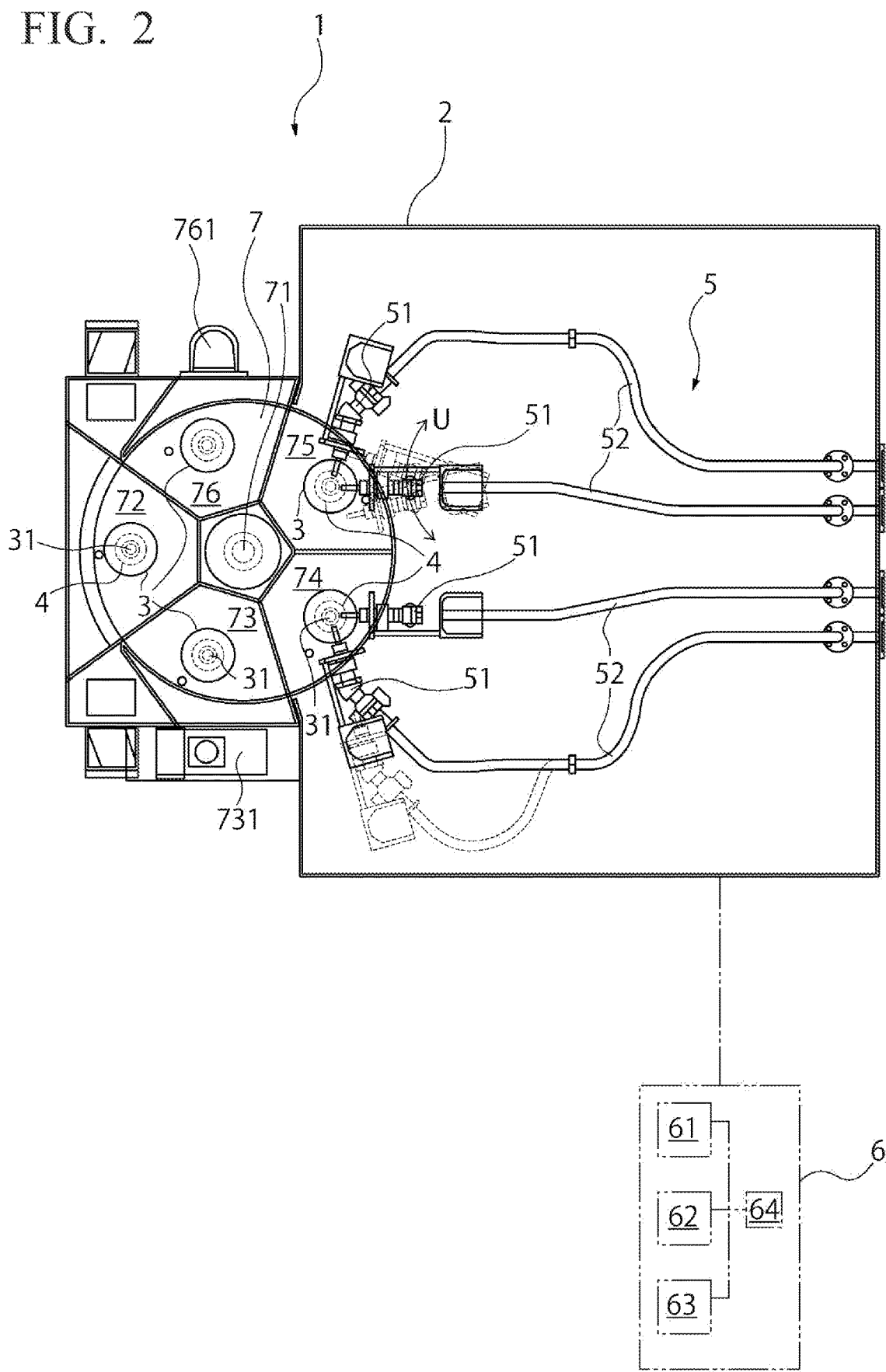
FIG. 2 is an explanatory plan view of the shot treatment apparatus according to the embodiment of the present invention.

As illustrated in FIGS. 1 and 2, the shot treatment apparatus 1 mainly comprises the five components below.

a. A cabinet 2, which is a room part for when blast-processing a workpiece 4 therein.

b. A spinning table 3, which is a rotating part on which the workpiece 4 is placed within the cabinet 2.

c. An ejection apparatus 5, which blast-processes the workpiece 4 placed on the spinning table 3.

d. A control apparatus 6, which controls the operations of the spinning table 3, the ejection apparatus 5, and a revolving table 7 described below.

e. The revolving table 7, which is a rotating part that further horizontally revolves multiple spinning tables 3.

The cabinet 2 is a box-shaped part made of a material such as a light metal. The cabinet 2 contains therein the previously described spinning table 3, ejection apparatus 5, revolving table 7, and the like.

The spinning table 3 is a substantially disk-shaped part made of a metal. The spinning table 3 is a pose-holding means for the workpiece 4 that spins about a central first rotary shaft 31 and holds the pose of the workpiece 4 placed thereon such that the workpiece 4 can withstand the ejection pressure of the shot media ejected by the ejection apparatus 5. Multiple spinning tables 3 are present and are disposed circumferentially on the revolving table 7 described below.

The ejection apparatus 5 comprises a nozzle tip 56, a nozzle 51 communicatively connected to the nozzle tip 56, a flexible hose 52 communicatively connected to the nozzle 51, and a shot media supplying mechanism 8 that supplies a shot media S to the hose 52.

The nozzle 51 is held so as to be positionable and three-dimensionally swingable with respect to the workpiece 4.

Here, positionable means the nozzle 51 is movable within the cabinet 2. In the present embodiment, the nozzle 51 is configured so as to be movable in an X-axis direction (in other words, a direction moving towards or away from the workpiece 4 in the horizontal direction) and in a Z-axis direction (in other words, a direction substantially parallel to the first rotary shaft 31 of the spinning table 3).

In addition, three-dimensionally swingable means swinging the nozzle tip 56 in a fan-like manner with respect to the X-axis, the Y-axis, and the Z-axis. The present embodiment has a configuration in which, as described below (illustrated in FIG. 3), the cooperation of swinging in the up-down direction (arrow V) by means of a shaft J and horizontal rotation with a ball screw spline shaft 54 as the axis allows the nozzle tip 56 to be swung substantially hemispherically.

The control apparatus 6 comprises: a computation means comprising a first control unit 61, a second control unit 62, and a third control unit 63; and work procedure information 64 (setting files and the like) stored in a memory (not shown) and the like.

The first control unit 61, the second control unit 62, and the third control unit 63 comprise a CPU, a memory, a connector, a buffer, and the like (not shown for any of the previously described control units), and refer to one area on a control board integrally controlling the individual operations and processes indicated below.

The control board includes, for example, various computation apparatuses such as personal computers (PCs) and motion controllers such as programmable logic controllers (PLCs) and digital signal processors (DSPs).

The work procedure information 64 is prerecorded in the control apparatus 6. The work procedure information 64 is associated with each type of the workpiece 4.

The work procedure information 64 includes setting files for the shot treatment apparatus 1 and the like. The work procedure information 64 is electronic data defining procedures for automatically subjecting the workpiece 4 to a shot treatment, setting parameters, and the like.

The work procedure information 64, which is electronic data, is registered in an online database. The work procedure information 64 is configured so as to be downloadable via a network and the like by a person responsible for the settings of the shot treatment apparatus 1.

In the present embodiment, the work procedure information 64 is illustrated in a format downloadable via a network and the like, but no limitation is made thereto. Transmission and reception of the work procedure information 64 to and from the control apparatus 6 may be performed with a not-shown portable storage medium and an input-and-output means therefor (for example, a USB flash drive and a USB port therefor) provided to the control apparatus 6.

In addition, it goes without saying that the work procedure information 64 may be stored by transferring information from another PC terminal to the control apparatus 6 using an information transmission cable and the like.

The revolving table 7 is a disk part made of a metal having a shape that closely resembles the previously described spinning table 3. However, the size thereof is similar to that of an enlarged spinning table 3. The revolving table 7 has a second rotary shaft 71 at the center thereof and revolves (rotates) the multiple spinning tables 3 disposed on the circumference thereof about the second rotary shaft 71.

As mentioned above, inside the cabinet 2, the revolving table 7 having the second rotary shaft 71 is provided and multiple spinning tables 3 are provided at equal intervals on the same circumference on the revolving table 7.

On the revolving table 7, five sealable treatment chambers 72 to 76 are provided around the second rotary shaft 71 and five spinning tables 3 are provided in each of the treatment chambers 72 to 76. The five treatment chambers 72 to 76 are configured such that the treatment chamber 72 is an installation/removal chamber 72, the treatment chamber 73 is a preparation chamber 73, the treatment chamber 74 is a first processing chamber 74, the treatment chamber 75 is a second processing chamber 75, and the treatment chamber 76 is a cleaning chamber 76. Each treatment chamber is configured so as to be openable to the outside. In the present embodiment, the treatment chambers 72 to 76 are separated by walls. The preparation chamber 73 comprises a recognition apparatus 731. The cleaning chamber 76 comprises a blowing apparatus 761. These apparatuses will be described below.

The spinning tables 3 and the revolving table 7 are rotationally driven by means of a drive mechanism (not shown). The driving of the spinning tables 3 and the revolving table 7 is controlled by means of the second control unit 62 of the control apparatus 6.

Figure 3:
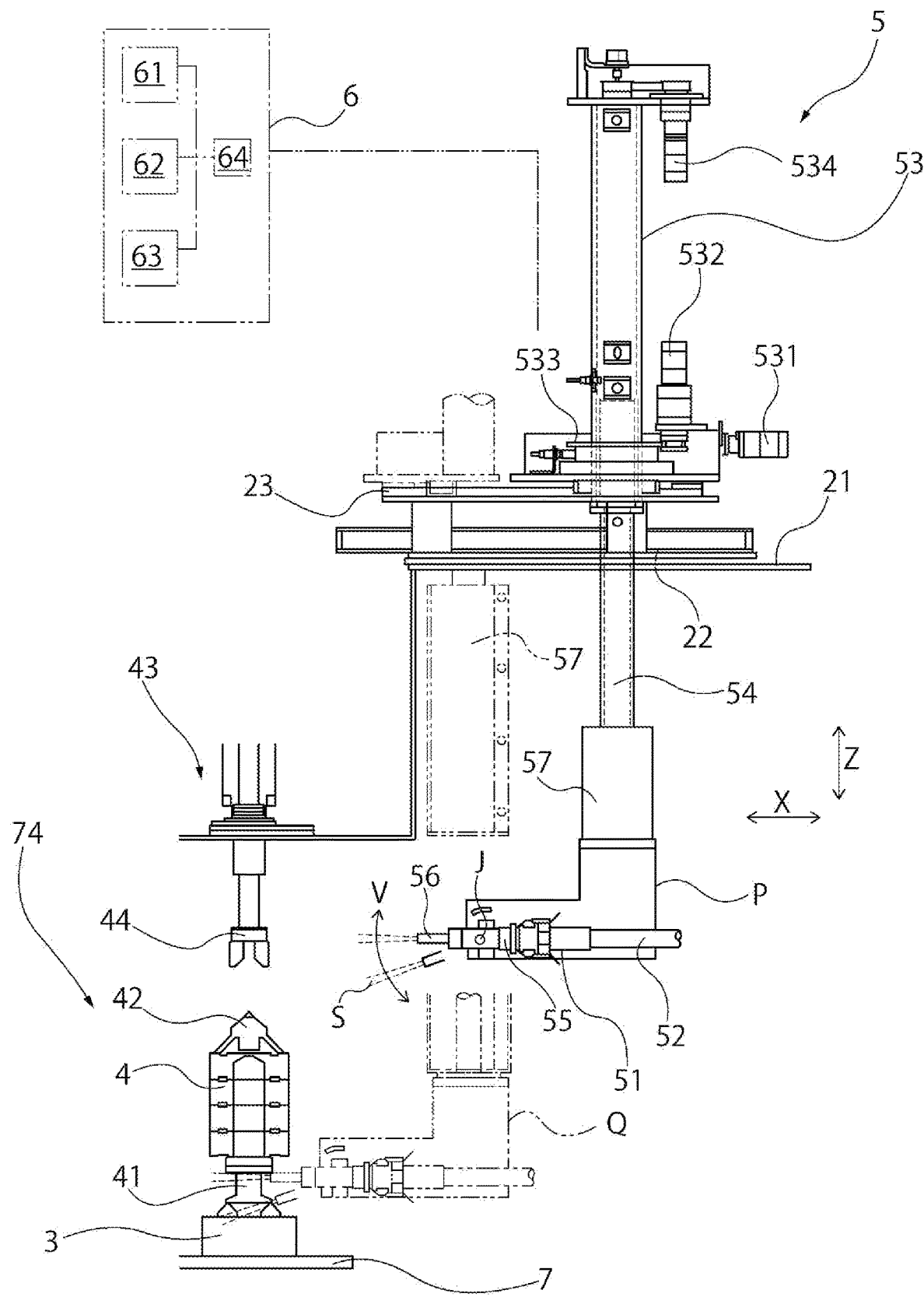
FIG. 3 is an explanatory side view of an ejection apparatus of the shot treatment apparatus according to the embodiment of the present invention.

FIG. 3 is an explanatory view illustrating the configuration of a drive system for moving and swinging the nozzle 51 as described above. FIG. 3 illustrates a state in which the first processing chamber 74 illustrated in FIG. 2 is caused to face one nozzle 51.

The ejection apparatus 5 includes a drive system for the nozzle 51. Reference sign 21 in this drawing is a ceiling 21 of the cabinet 2. A support 53 is installed on the top surface side of the ceiling 21. A long hole 22 in the arrow X direction provided in the ceiling 21 is provided to the support 53. The ball screw spline shaft 54 is supported so as to extend in the up-down direction through the long hole 22. In this case, the ball screw spline shaft 54 is supported so as to be movable in the up-down direction (Z-direction) and turnable within a certain range. The nozzle 51 is supported at the lower end of the ball screw spline shaft 54. The nozzle 51 comprises a nozzle body 55 and a nozzle tip 56 at the distal end thereof. The nozzle tip 56 is swingable in the up-down direction (arrow V) about the shaft J in the horizontal direction.

In FIG. 3, the movement of the nozzle 51 in the up-down direction is represented by the arrow Z and the up-down swinging of the nozzle tip 56 is represented by the arrow V.

The hose 52 that supplies the shot media S is connected to the terminal end of the nozzle 51. The nozzle 51, a portion of the hose 52, and a portion of the ball screw spline shaft 54 are covered by a bellows 57. Thus, the parts are not damaged by the bouncing shot media S when performing a shot treatment.

The support 53 is supported by a guide rail 23 provided above the ceiling 21. The support 53 is movable in the X-direction in which the guide rail 23 extends. An X-direction drive motor 531 is mounted to the support 53. By driving this drive motor 531, it is possible to move the support 53 and the ball screw spline shaft 54 in the X-direction via a gear train (not shown). This movement makes it possible to perform the operation of moving the nozzle 51 of the ejection apparatus 5 towards or away from the workpiece 4 and positioning in the X-direction.

In addition, a left-right oscillation drive motor 532 is mounted to the support 53. By driving this drive motor 532, it is possible to turn the ball screw spline shaft 54 within a certain range via a gear train 533. This turning makes it possible to, with respect to the workpiece 4, swing the nozzle 51 in the left-right direction and position at a predetermined angle in the left-right direction.

In addition, a Z-direction drive motor 534 is mounted to the upper end of the support 53. By driving the drive motor 534, it is possible to move the ball screw spline shaft 54 in the up-down direction (Z-direction). This movement makes it possible to, with respect to the workpiece 4, move the nozzle 51 up and down in the up-down direction (Z-direction) and perform positioning in the Z-direction.

FIG. 3 illustrates a portion of the first processing chamber 74. As illustrated in FIG. 3, a workpiece 4 is placed on the spinning table 3 provided on the revolving table 7. In this embodiment, gears are shown as an example of the workpiece 4. As illustrated in FIG. 3, four gears are stacked. The workpiece 4 is fitted to a shaft body 41 and the entire workpiece 4 is fixed to a fixed position by means of a pressing member 42. A holding member 44 of a workpiece holding mechanism 43 is positioned above the pressing member 42. When performing a shot treatment, the holding member 44 descends and holds the pressing member 42 in a fixed position such that the four gears (workpiece 4) are securely held.

Figure 4:
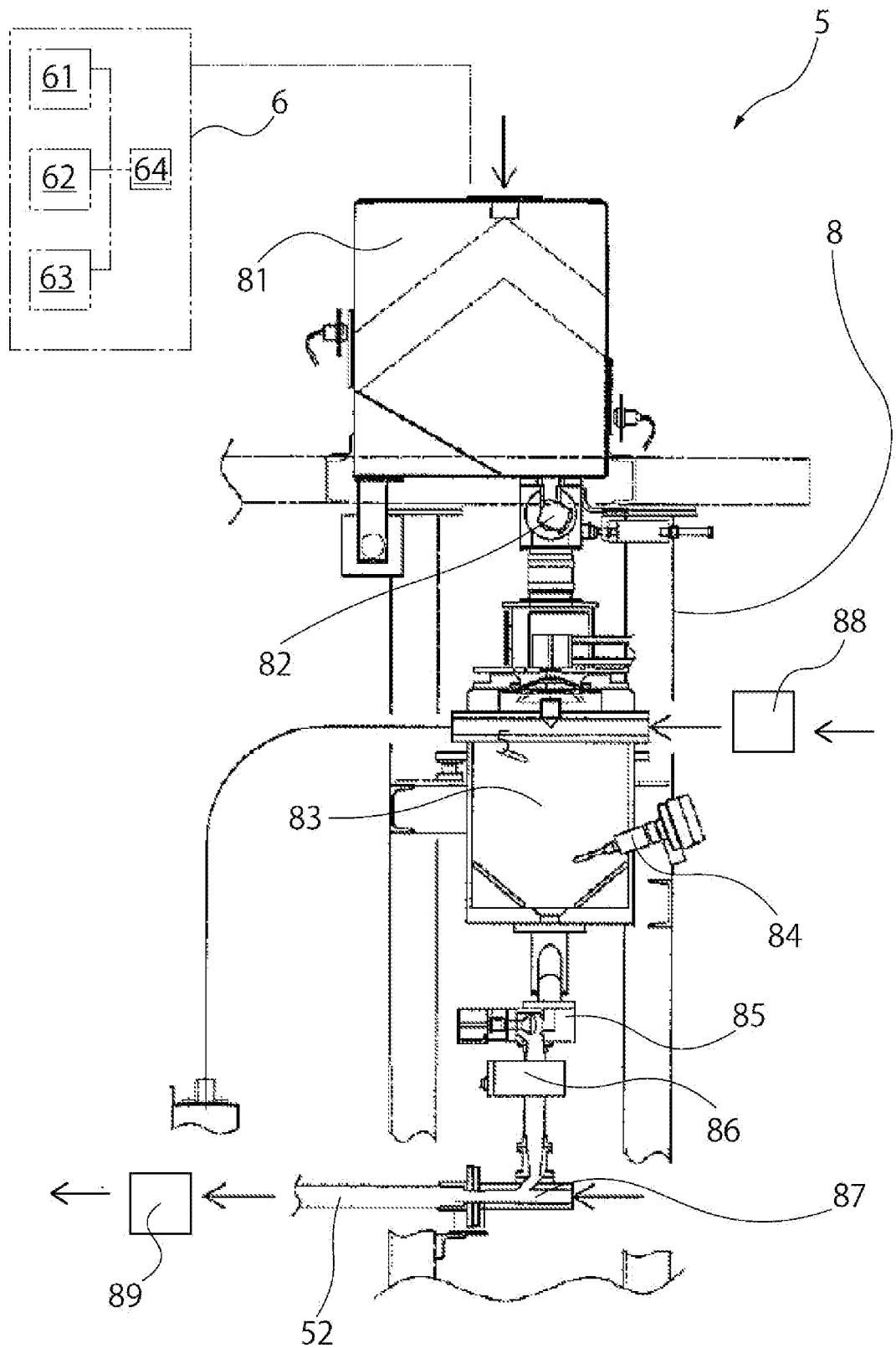
FIG. 4 is an explanatory side view of a shot media supplying mechanism of the shot treatment apparatus according to the embodiment of the present invention.

FIG. 4 illustrates important parts of the shot media supplying mechanism 8 that supplies the shot media S to the nozzle 51 illustrated in FIGS. 1 to 3 in the ejection apparatus 5. The shot media supplying mechanism 8 is provided outside of the cabinet 2. The shot media supplying mechanism 8 comprises a storage tank 81 that stores the shot media S, a dumper 82, a pressurized tank 83, a level sensor 84 provided within the pressurized tank 83, a cut gate valve 85, a supplied amount adjusting apparatus 86, and a mixing valve 87.

The shot media S stored in the storage tank 81 is loaded into the pressurized tank 83 via the dumper 82. Control of the shot media supplying mechanism 8, including control of the opening and closing of the dumper 82, the pressure of the pressurized tank 83, the amount of shot media S within the pressurized tank 83, the opening and closing of the cut gate valve 85, and the supplied amount adjusting apparatus 86 are controlled by the third control unit 63 of the control apparatus 6.

In the present embodiment, compressed air is used as the fluid for circulating the shot media. Under the control of the third control unit 63, the shot media S loaded into the pressurized tank 83 circulates through the flexible hose 52 via the cut gate valve 85, the supplied amount adjusting apparatus 86, and the mixing valve 87 and reaches the nozzle 51.

Here, reference sign 88 illustrated in FIG. 4 is a measuring apparatus 88 that measures the pressure or flow rate, or both, of the compressed air (fluid). Reference sign 89 is a measuring apparatus 89 that measures the ejection pressure of the shot media from the nozzle. The ejection apparatus 5 comprises the measuring apparatuses 88, 89 that measure the pressure or flow rate, or both, of compressed air (fluid) that conveys the shot media S, and the ejection pressure of the shot media from the nozzle. The control apparatus 6 comprises the third control unit 63 that controls the ejection apparatus on the basis of the measurement results of the measuring apparatuses 88, 89.

Next, a shot treatment of the workpiece 4 by means of the shot treatment apparatus 1 comprising the above-mentioned configurations will be described. As previously described, five treatment chambers 72 to 76 are provided on top of the revolving table 7. The workpiece 4 is processed by undergoing the five steps indicated below.

(1) Workpiece 4 Placement

An operator A places a workpiece 4 on a spinning table 3 by stacking four gears to be processed on the shaft body 41 and fitting the pressing member 42 within the installation/removal chamber 72. When the placement work ends, the operator A transmits information indicating that the placement work is in a completed state to an input apparatus (not shown) that communicates information to the control apparatus 6. The control apparatus 6 monitors the state of the treatment chambers and checks whether the preparation of each treatment chamber has ended. Upon confirming that preparation of each treatment chamber has ended, the control apparatus 6 intermittently moves the revolving table to a reference position by means of the second control unit 62. Specifically, the control apparatus 6 drives the revolving table 7 such that the workpiece 4 that was placed at this point is rotated and moved to the preparation chamber 73. Here, the reference position of the nozzle 51 means the position of the rotary shaft 31 of the spinning table 3 during processing in the first and second processing chambers 74, 75 described below.

(2) Recognition of Workpiece 4 Type

The preparation chamber 73 comprises the recognition apparatus 731 that recognizes the type of the workpiece 4. In the present example, the recognition apparatus 731 is a QR code (registered trademark) reader 731. The QR code (registered trademark) reader 731 reads a QR code (registered trademark) printed on the workpiece 4 and transmits this information to the control apparatus 6. The control apparatus 6 identifies the type of the workpiece 4 and the like on the basis of the sent information and selects work procedure information 64 corresponding to the type of the workpiece 4. Work procedure information 64 is processing settings information that controls the operation of the shot treatment apparatus 1 in the processing for the workpiece 4. Control targets include the positioning and operation of the nozzle 51, rotation of the spinning table, flow rate and pressure of the shot media S from the nozzle 51, and the like. The control apparatus 6 comprises work procedure information 64 set for each type of the workpiece 4, and controls the ejection apparatus 5 on the basis of the work procedure information 64 selected at this point.

(3) Shot Treatment of Workpiece 4

After the recognition of the type ends as previously described, the workpiece 4 is sent from the preparation chamber 73 to the first processing chamber 74 by means of the rotational driving of the revolving table 7 controlled by the second control unit 62. In the present example, two nozzles 51 are provided in the first processing chamber 74. The operations of the nozzles 51 can be similar, except that the respective operations are independent. In the present example, a description will be provided focusing on one nozzle 51. In this case, similar to one nozzle 51, the other nozzle 51 is also simultaneously independently controlled.

When the workpiece 4 is being moved to the first processing chamber 74, the nozzle 51 is stopped at an origin position that does not interfere with the movement of the workpiece 4, illustrated as solid line P in FIG. 3. When the workpiece 4 moves to the reference position of the nozzle 51, the nozzle 51 moves to a position set in the work procedure information 64 (position Q indicated by a dash-and-double-dot line in FIG. 3) in relation to swinging in the X-direction, Z-direction, and left-right and up-down directions by means of the operation of the drive system of the nozzle 51 described previously. Thereafter, a shot treatment according to the processing settings in the work procedure information 64 is performed. The spinning table 3 rotates at a rotation speed set in the work procedure information 64. The shot media S is ejected from the nozzle 51 at a set pressure and flow rate. The nozzle 51 moves up and down in the Z-direction a set number of times at a speed set in the work procedure information 64.

When the shot treatment according to the settings of the work procedure information 64 ends, the nozzle 51 again moves to the origin position, which is the initial position. Thereafter, the workpiece 4 is sent from the first processing chamber 74 to the second processing chamber 75. In the second processing chamber 75, a second shot treatment is performed based on the work procedure information 64. When the shot treatment ends, the workpiece 4 is sent from the second processing chamber 75 to the cleaning chamber 76.

(4) Workpiece 4 Cleaning

The cleaning chamber 76 comprises the blowing apparatus 761 that removes foreign matter such as scale-like residual sand and the shot media S adhered to the workpiece 4. After the workpiece 4 has been sent into the cleaning chamber 76, the blowing apparatus 761 blows the workpiece 4 using compressed air to remove foreign matter. At this time, the entire workpiece 4 is blown by rotating the spinning table 3. After the blowing treatment has ended, the workpiece 4 is sent from the cleaning chamber 76 to the installation/removal chamber 72.

(5) Taking Out Workpiece 4

The operator A takes out the workpiece 4 that has returned to the installation/removal chamber 72 again and transports the workpiece 4 to the next step. After taking out the workpiece 4 and returning to the previously described step (1) again, the operator A places a new workpiece 4 on the spinning table 3.

Steps (1) to (5) mentioned above are simultaneously performed, and the control apparatus 6 checks that the treatment in each of the treatment chambers 72 to 76 has ended and controls the revolving table 7 to move intermittently to perform shot treatments. In the present example, shot treatments are performed with both treatment chambers, the first and second processing chambers 74, 75, but it is also possible to set such that shot treatments are performed with only one processing chamber.

Figure 5:
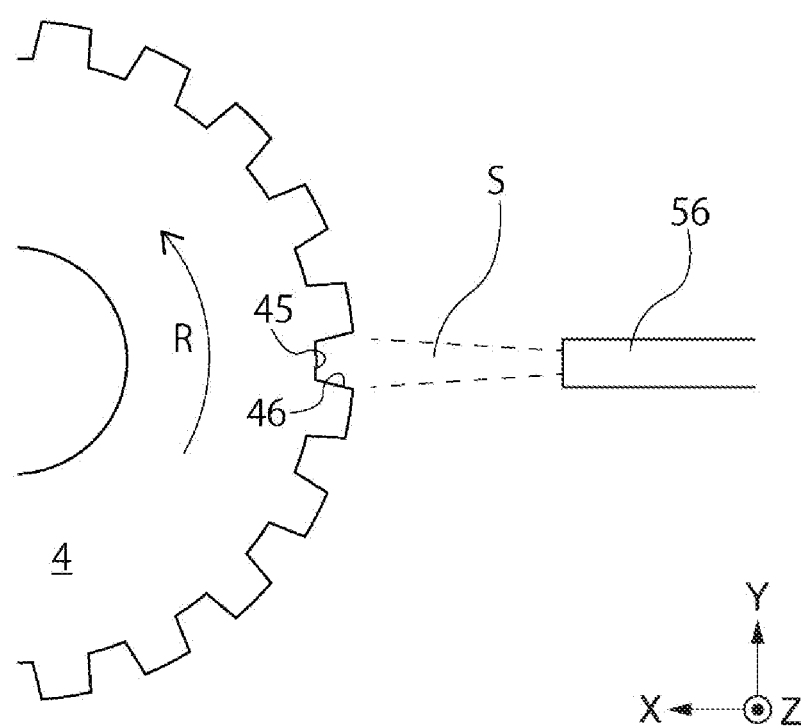
FIG. 5 is an explanatory view of the vicinity of a nozzle of a shot treatment according to the embodiment of the present invention.
Figure 6:
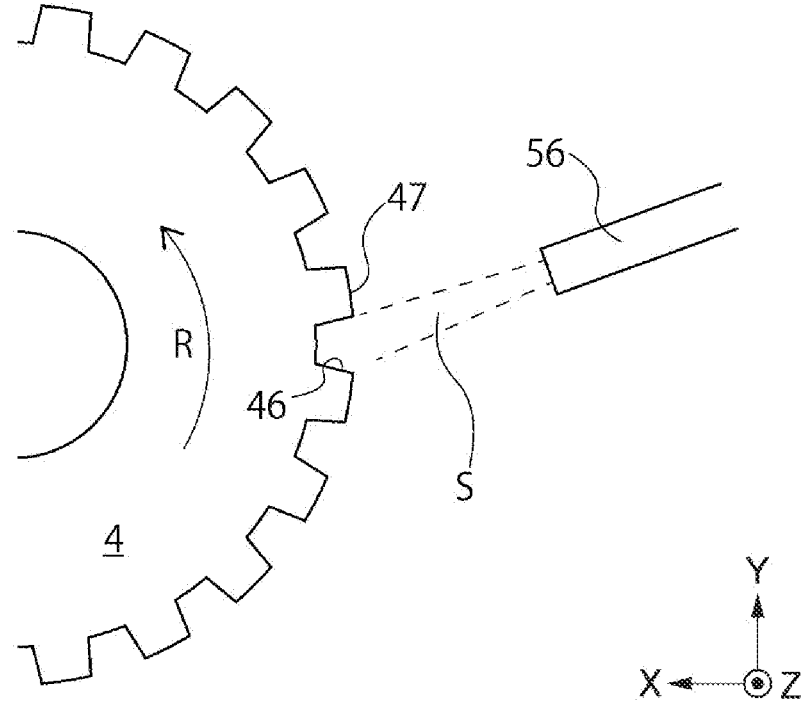
FIG. 6 is an explanatory view of the vicinity of a nozzle of a shot treatment according to the embodiment of the present invention.
Figure 7:
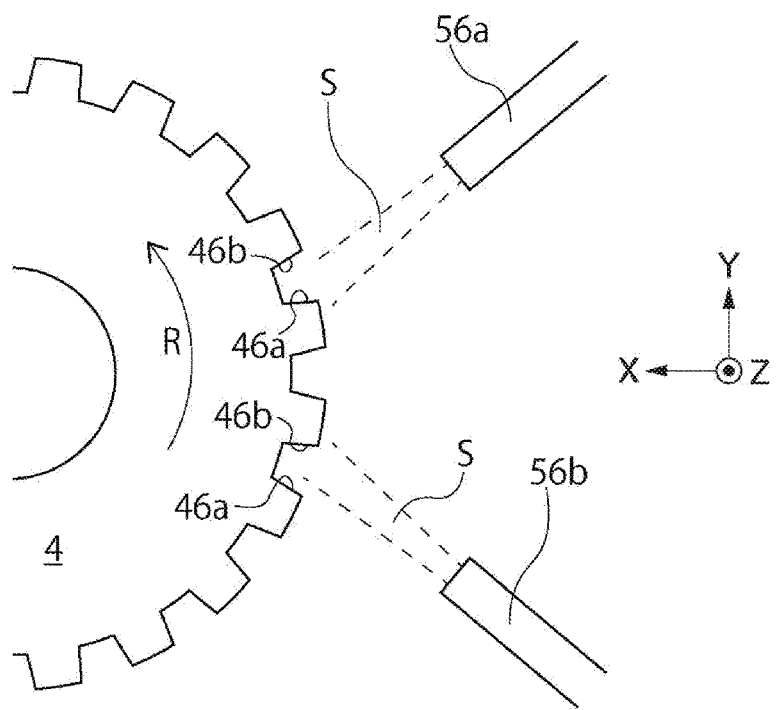
FIG. 7 is an explanatory view of the vicinity of a nozzle of a shot treatment according to the embodiment of the present invention.

Next, the effects of angling the ejection of the shot media S with respect to the workpiece 4 will be described with reference to FIGS. 5 to 7. FIGS. 5 to 7 are for describing the shot media S being ejected towards a gear 4 (workpiece 4) and are explanatory views illustrating a portion of the gear 4 and the nozzle tip 56 at the front end of the nozzle 51.

FIG. 5 represents the shot media S being ejected substantially perpendicularly from the distal end of the nozzle tip 56 towards a bottom face 45 of a groove of the gear 4. The gear 4 rotates in the direction indicated by arrow R by means of rotation of the spinning table 3 during a shot treatment. When a shot treatment is performed at such an angle, because the shot media S only collides in an oblique direction or substantially horizontally with a side 46 of the groove of the gear 4 originally intended to be surface-treated, the amount of shot media S ejected towards the side 46 is small in comparison to the jetted amount of shot media S.

There, the shot media S is ejected at a predetermined angle with respect to the workpiece 4 using the left-right swinging mechanism of the nozzle 51 in the present embodiment. FIG. 6 illustrates the ejection of the shot media S with respect to the gear 4 at a predetermined angle. Compared to FIG. 5, a large amount of shot media S is being ejected to the side 46 to be subjected to a shot treatment. Because setting a large angle could cause the shot media S to be shielded by a protrusion 47 of the gear 4, there is a need, as illustrated in FIG. 6, to set an appropriate angle in accordance with the shape of the gear 4. FIG. 7 represents simultaneous ejection of the shot media S by means of two nozzle tips 56a, 56b. Because there are two sides, side 46a and side 46b, of the groove of the gear 4 to be subjected to a shot treatment, it is possible to simultaneously treat the sides to be subjected to a treatment by the two nozzle tips performing simultaneous ejection in this manner.

Figure 8:
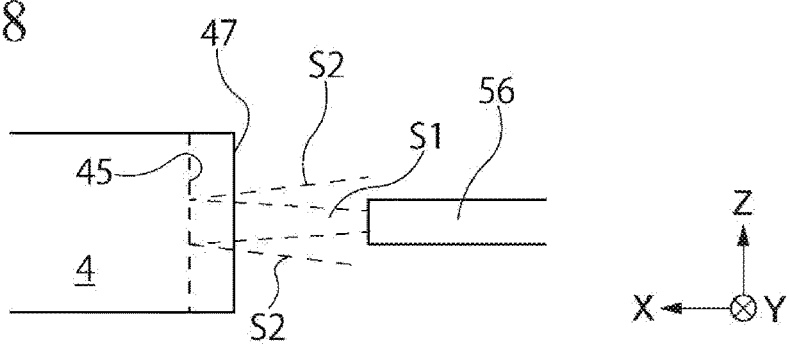
FIG. 8 is an explanatory view of the vicinity of a nozzle of a shot treatment according to the embodiment of the present invention.
Figure 9:
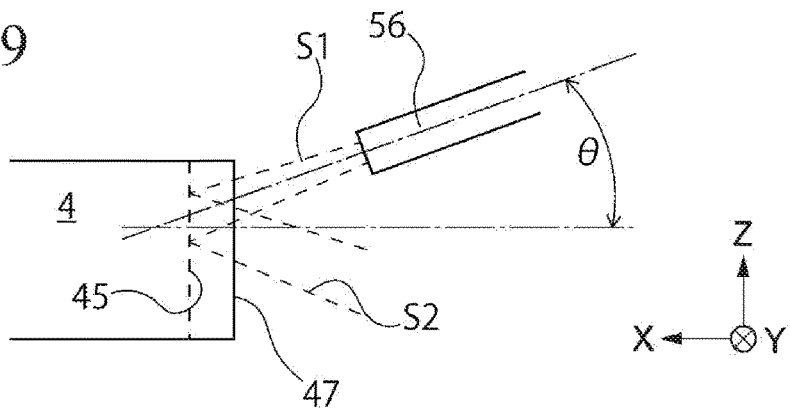
FIG. 9 is an explanatory view of the vicinity of a nozzle of a shot treatment according to the embodiment of the present invention.

FIGS. 8 and 9 are explanatory views of FIGS. 5 to 7 seen from the side. In the drawings, the protrusion 47 of the gear 4 is indicated by a solid line and the bottom 45 of the groove is indicated by a dotted line. When subjecting the groove of the gear 4 to a shot treatment, if the shot media S is ejected horizontally, the angle of incidence and the angle of reflection of the shot media S will be substantially the same, so there is a risk that a shot media S2 that has collided with the surface to be treated and bounced back and a shot media S1 ejected from the nozzle tip 56 will collide, reducing the amount of shot media S that reaches the surface to be treated (FIG. 8). To avoid this, the nozzle tip 56 is pointed downwards (upwards) at an angle θ and the shot media S is ejected, changing the reflection of the shot media S colliding with the surface to be treated to be downwards (upwards). The shot media S1 incident from above (below) with a predetermined angle, after colliding with the surface to be treated, reflects downwards (upwards) as the shot media S2 (FIG. 9), so the collision of the shot media S is avoided and it is possible to increase the amount of shot media that reaches the surface to be treated.

As described above, the shot treatment apparatus 1 comprises a spinning table 3 which has a first rotary shaft 31 and which holds and rotates a workpiece 4, an ejection apparatus 5 that ejects a shot media S from a nozzle 51 to the workpiece 4, and a control apparatus 6 comprising a first control unit 61 that controls the ejection apparatus 5. In addition, the shot treatment method using the shot treatment apparatus 1 comprises holding and rotating the workpiece 4 with the first rotary shaft 31, ejecting the shot media S from the nozzle 51 to the workpiece 4, holding the nozzle 51 so as to be positionable and/or movable in the directions of an X-axis moving towards or away from the workpiece 4 and a Z-axis parallel to the first rotary shaft 31, holding the nozzle 51 so as to enable left-right and up-down positioning and/or swinging with respect to the first rotary shaft 31, and performing processing through a combination of these positionings, movements, and swings.

As described above, the shot treatment apparatus and the shot treatment method of the present embodiment can be applied to the mass production of a wide range of products.

The shot treatment apparatus 1 and the shot treatment method of the present embodiment can increase throughput of shot treatments and can be applied to the production of a wide range of products because the installation/removal chamber 72, the preparation chamber 73, the first processing chamber 74, the second processing chamber 75, and the cleaning chamber 76 are provided on the revolving table 7 and the workpieces 4 placed in each of the treatment chambers 72 to 76 are simultaneously treated in parallel.

The shot treatment apparatus 1 and the shot treatment method of the present embodiment comprise work procedure information 64 set for each type of the workpiece 4 and a recognition apparatus 731 that recognizes the type of the workpiece 4, and selection of the work procedure information 64 that sets control of the shot treatment is performed on the basis of the type of the workpiece 4 recognized by the recognition apparatus 731. Accordingly, it is possible to prepare work procedure information 64 of the workpiece 4 placed in the preparation chamber 73 before shot treatments are performed with the first and second processing chambers 74, 75, and it is possible to efficiently mass-produce a wide range of products.

In the embodiment mentioned above, a QR code (registered trademark) reader that recognizes a QR code (registered trademark) printed on the workpiece 4 was employed as the recognition apparatus 731 that recognizes the type of the workpiece 4, but no limitation is made thereto. The apparatus may be one that reads a bar code or a code that is a combination of alphabetical letters and numbers. Moreover, image recognition through the shape of the workpiece itself by means of a video camera may be employed. In addition, when not using the recognition apparatus 731, the operator A may input information required for selecting work procedure information, such as product type number, to the control apparatus 6 when setting a workpiece 4 in the installation/removal chamber.

In the present embodiment, the operation of the nozzle 51 during a shot treatment is described such that, regarding the X-axis, left-right, and up-down swinging, the nozzle 51 is positioned and then stopped, and regarding the Z-axis, the nozzle 51 is moved up and down, but no limitation is made thereto. Any combination of positioning and then stopping the nozzle 51 with respect to the X-axis, Y-axis, left-right, and up-down operations and operations in which the nozzle 51 continues to move with respect to the same during a shot treatment can be set. It is also possible to freely select whether to use or not use two processing chambers 74, 75. In addition, in the present embodiment, two nozzles 51 are provided in one processing chamber, but the number thereof is not limited thereto, and it is possible to implement one or multiple nozzles. Even when there are multiple nozzles 51, control thereof can be set independently, and the use or non-use thereof is also optionally selected.

In addition, in the above-mentioned embodiment, the treatment chambers 72 to 76 are configured so as to be separated by walls, but no limitation is made thereto. Strip-like rubber sheets may be installed in a slit-curtain-like manner between the treatment chambers 72 to 76.

REFERENCE SIGNS LIST

1 Shot treatment apparatus
3 Spinning table
31 First rotary shaft
4 Workpiece
5 Ejection apparatus
51 Nozzle
6 Control apparatus
61 First control unit
62 Second control unit
63 Third control unit
64 Work procedure information
7 Revolving table
71 Second rotary shaft
72 Installation/removal chamber (treatment chamber)
73 Preparation chamber (treatment chamber)
731 Recognition apparatus (QR code (registered trademark) reader)
74 Processing chamber 1 (treatment chamber)
75 Processing chamber 2 (treatment chamber)
76 Cleaning chamber (treatment chamber)
88, 89 Pressure/flow rate measuring apparatus
S Shot media

The invention claimed is:

1. A shot treatment apparatus, comprising:
a cabinet having a treatment chamber formed therein;
plural spinning tables within the treatment chamber and which hold and rotate a workpiece;
a nozzle configured to eject a shot media to the workpiece to process the workpiece; and
a controller comprising a processor configured to control the nozzle;
the nozzle being held so as to be positionable and three-dimensionally swingable, including positionable and swingable vertically and horizontally, with respect to the workpiece.

2. The shot treatment apparatus according to claim 1, comprising:
a revolving table on which the spinning tables are disposed on the same circumference at predetermined intervals;
wherein the processor is configured to control rotation of the revolving table such that the spinning tables sequentially move to a position of the nozzle.

3. The shot treatment apparatus according to claim 1, wherein the controller comprises work procedure information set to be selectable for each type of the workpiece, the ejection and processing being performed on the basis of the work procedure information selected.

4. The shot treatment apparatus according to claim 3, comprising a recognition apparatus configured to recognize a type of the workpiece, wherein selection of the work procedure information is performed on the basis of the type of the workpiece recognized by the recognition apparatus.

5. The shot treatment apparatus according to claim 1, wherein the processor is configured to control the nozzle on the basis of at least one of a pressure and a flow rate of a fluid that circulates the shot media and the basis of a pressure at which the shot media is ejected from the nozzle.

* * * * *